United States Patent [19]

Pfeifer et al.

[11] 4,258,176
[45] Mar. 24, 1981

[54] TRANSPARENT COPOLYAMIDE FROM 1,10-DISUBSTITUTED $C_{11}$ DIAMINE

[75] Inventors: Josef Pfeifer, Therwil, Switzerland; Dieter Reinehr, Kandern, Fed. Rep. of Germany

[73] Assignee: Ciba-Geigy Corporation, Ardsley, N.Y.

[21] Appl. No.: 83,143

[22] Filed: Oct. 9, 1979

[30] Foreign Application Priority Data

Oct. 18, 1978 [CH] Switzerland .................. 10772/78

[51] Int. Cl.³ .................................... C08G 69/26
[52] U.S. Cl. .................................... 528/338; 528/339; 528/340; 528/346; 528/347; 528/349
[58] Field of Search ............... 528/349, 338, 339, 340, 528/347, 346

[56] References Cited

U.S. PATENT DOCUMENTS 3,563,959  2/1971  Schade et al. .................. 528/349

*Primary Examiner*—Harold D. Anderson
*Attorney, Agent, or Firm*—Luther A. R. Hall

[57] ABSTRACT

There are described transparent copolyamides which are obtained by reaction of a mixture (A) consisting of essentially stoichiometric amounts of a diamine

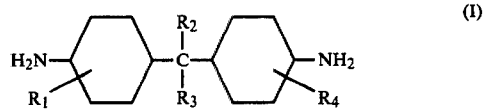

(I)

and isophthalic acid or terephthalic acid, or a mixture of isophthalic acid and terephthalic acid, with a mixture (B) consisting of essentially stoichiometric amounts of a diamine

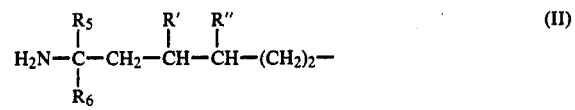

(II)

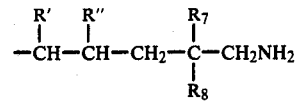

and terephthalic acid or a mixture of terephthalic acid and isophthalic acid, or with a mixture (C) consisting of essentially stoichiometric amounts of a diamine

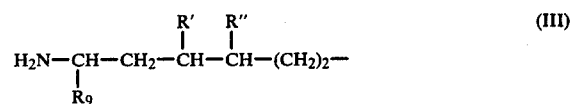

(III)

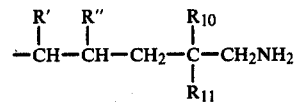

and terephthalic acid or isophthalic acid or mixtures thereof, wherein R', R" and $R_1$ to $R_{11}$ have the meanings given in claim 1.

The novel copolyamides are distinguished by good thermoplastic processing characteristics, by low water absorption and by good stability to hydrolysis, and are suitable for producing transparent moulded articles.

9 Claims, No Drawings

TRANSPARENT COPOLYAMIDE FROM 1,10-DISUBSTITUTED C₁₁ DIAMINE

The present invention relates to novel transparent copolyamides, to processes for producing them, and to the use thereof for the production of moulded articles.

Transparent copolyamides formed from 4,4'-diaminodicyclohexylmethane, hexamethylenediamine, isophthalic acid and terephthalic acid are described in the U.S. Pat. No. 3,597,400. These copolyamides absorb a great amount of water and their glass transition temperatures decrease considerably on immersion in water. The U.S. Pat. No. 2,696,482 describes transparent polyamides formed from 4,4'-diaminodicyclohexylmethane and isophthalic acid. These polyamides have a very high melt viscosity and a high water absorption, and only with difficulty can they be condensed in the melt or processed from the melt. Finally, from the German Offenlegungsschrift No. 2,642,244 there are known transparent copolyamides formed from cycloaliphatic diamines, especially from 4,4'-diaminodicyclohexylmethane, isophthalic acid and aliphatic components, such as amino acids, aliphatic diamines and dicarboxylic acids, with these aliphatic components having to contain, relative to each amide group or to each pair of amide-forming groups, on average at least 9 methylene groups, and the number of methylene groups between the amide-forming groups being at least 6. If these systems are used with the aim of producing copolyamides having high glass transition temperatures, the products obtained are brittle and have a relatively high water absorption.

There have now been found novel transparent copolyamides formed from aromatic dicarboxylic acids, 4,4'-diaminodicyclohexylalkanes and long-chain, branched alkylenediamines, which copolyamides are free from the disadvantages mentioned above.

The transparent copolyamides according to the invention have a reduced specific viscosity of at least 0.5 dl/g, preferably about 0.7 to about 2.5, and particularly about 0.8 to about 1.8 dl/g, measured on a 0.5% solution in m-cresol at 25° C. (in the following also termed reduced solution viscosity), and they are obtained by reaction of a mixture (A) consisting of essentially stoichiometric amounts of a diamine of the formula I

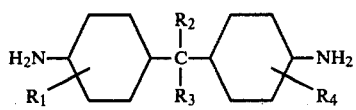

(I)

and isophthalic acid or terephthalic acid, or amide-forming derivatives thereof, or a mixture of isophthalic acid and terephthalic acid, or amide-forming derivatives thereof, either with a mixture (B) consisting of essentially stoichiometric amounts of a diamine of the formula II

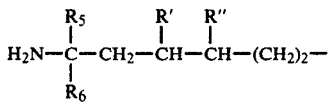

(II)

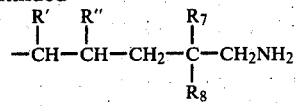

and terephthalic acid or an amide-forming derivative thereof, or a mixture of terephthalic acid and isophthalic acid, or amide-forming derivatives thereof, in a molar ratio of terephthalic acid (derivative): isophthalic acid (derivative) of 8:2 to 10:0, or with a mixture (C) consisting of essentially stoichiometric amounts of a diamine of the formula III

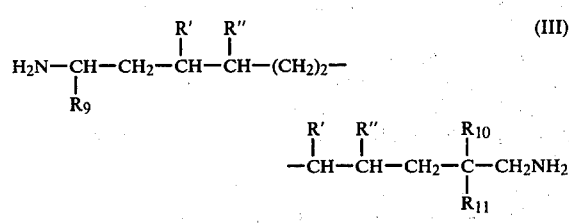

(III)

and terephthalic acid or isophthalic acid, or mixtures or amide-forming derivatives thereof, wherein R' and R" independently of one another are each hydrogen or methyl, $R_1$ to $R_4$ independently of one another are each hydrogen or alkyl having 1–4 C atoms, $R_5$ is alkyl having 1–12 C atoms, or unsubstituted or substituted aryl, $R_6$ is hydrogen or alkyl having 1–6 C atoms, or $R_5$ and $R_6$ together are alkylene having 4–7 C atoms, $R_7$ is alkyl having 1–8 C atoms, $R_8$ is hydrogen or alkyl having 1–5 C atoms, $R_9$ is cycloalkyl which has 5–12 ring C atoms and which is unsubstituted or substituted by $C_{1-4}$-alkyl, $R_{10}$ is hydrogen or methyl, and $R_{11}$ is methyl, or $R_{10}$ and $R_{11}$ together are alkylene having 4–11 C atoms, the proportion of mixture (C) being 60–80 percent by weight and that of mixture (B) being 50–80 percent by weight, with the proviso that with a proportion of mixture (B) of up to 65 percent by weight, at most 70 mol.% of isophthalic acid or of an amide-forming derivative thereof in mixture (A) can be replaced by terephthalic acid or by an amide-forming derivative thereof, these weight percentages in the case of amide-forming derivatives of isophthalic acid or of terephthalic acid relating to identical functional groups.

The copolyamides according to the invention are distinguished by high glass transition temperatures and accordingly by high dimensional stability under heat, by good thermoplastic processing characteristics, by low water absorption combined with reduced dependence of the mechanical and electrical properties on the surrounding humidity, and by improved stability to hydrolysis. The novel copolyamides retain high softening temperatures even in the water-saturated condition, and are resistant to boiling water.

Of R' and R", one in each case is preferably hydrogen and the other methyl; particularly preferably however R' and R" are each hydrogen.

Alkyl groups denoted by $R_1$ to $R_8$ or alkyl substituents on cycloalkyl groups $R_9$ can be straight-chain or branched-chain. Examples of alkyl groups of this type are: the methyl, ethyl, n-propyl, isopropyl, n-, sec- and tert-butyl, n-pentyl, 2- or 3-pentyl, n-hexyl, 2- or 3-heptyl, n-octyl, n-decyl and n-dodecyl groups.

Alkyl groups $R_1$ to $R_4$ are preferably straight-chain and contain 1 or 2 C atoms. Particularly preferably, $R_2$ and $R_3$ are each hydrogen, and $R_1$ to $R_4$ are each methyl.

If $R_5$ is unsubstituted or substituted aryl, possible substituents are in particular alkyl groups having 1–4 C atoms, and especially 1 or 2 C atoms. Aryl groups $R_5$ can carry several alkyl groups, but are preferably substituted by only one alkyl group. The 1- or 2-naphthyl group, and phenyl substituted by one alkyl group having 1–4 C atoms and especially 1 or 2 C atoms are particularly preferred, and more especially unsubstituted phenyl.

If $R_5$ is an alkyl group as defined, it is in particular straight-chain alkyl having 1–6 C atoms, or radicals —$CH(R_{12})(R_{13})$, wherein $R_{12}$ is alkyl having 1–4 C atoms, and $R_{13}$ is alkyl having 1–6 C atoms. The stated alkyl groups $R_{12}$ and $R_{13}$ are preferably straight-chain, and are especially methyl, ethyl, n-propyl or n-butyl.

Alkylene groups formed by $R_5$ and $R_6$ and/or $R_{10}$ and $R_{11}$ are advantageously straight-chain. If $R_5$ and $R_6$ together are an alkylene group, it is in particular the tetramethylene group and especially the pentamethylene group. Alkylene groups formed by $R_{10}$ and $R_{11}$ together preferably have 4–7 C atoms. They are particularly the tetramethylene group, the heptamethylene group and more especially the pentamethylene group.

Alkyl groups $R_7$ and $R_8$ are advantageously straight-chain and have 1–6 C atoms and 1–4 C atoms, respectively. Particularly preferbly, $R_7$ and $R_8$ independently of one another are each methyl, ethyl, n-propyl or n-butyl.

If cycloalkyl groups $R_9$ are substituted by alkyl groups, they are in particular cycloalkyl substituted by one methyl or ethyl group. Preferably, however, cycloalkyl groups $R_9$ are unsubstituted and have 5–8 ring C atoms. $R_9$ is particularly preferably the cyclopentyl group and above all the cyclohexyl group.

Preferred copolyamides according to the invention are those which are obtained by reaction of a mixture (A) consisting of essentially stoichiometric amounts of a diamine of the formula I and isophthalic acid or terephthalic acid or a mixture of isophthalic acid and terephthalic acid, or amide-forming derivatives thereof, with a mixture (B) consisting of essentially stoichiometric amounts of a diamine of the formula II and terephthalic acid or an amide-forming derivative thereof, wherein R' and R" are each hydrogen, $R_1$–$R_4$ independently of one another are hydrogen or methyl, $R_5$ is phenyl, straight-chain alkyl having 1–6 C atoms or —$CH(R_{12})(R_{13})$, $R_6$ is hydrogen or methyl, $R_7$ and $R_{13}$ independently of one another are each alkyl having 1–6 C atoms, and $R_8$ and $R_{12}$ independently of one another are each alkyl having 1–4 C atoms, the proportion of mixture (B) being 50–75 percent by weight, these weight percentages in the case of amide-forming derivatives of iso- or terephthalic acid relating to identical functional groups; particularly copolyamides of the type mentioned above, wherein R' and R" are each hydrogen, $R_1$ and $R_4$ are each methyl, $R_2$ and $R_3$ are each hydrogen, $R_6$ is hydrogen, $R_5$ is —$CH(R_{12})(R_{13})$, and $R_7$ and $R_{13}$ and $R_8$ and $R_{12}$ are each methyl, ethyl, n-propyl or n-butyl, and the proportion of mixture B) is 50–70 percent by weight.

Further preferred copolyamides are those which are obtained by reaction of a mixture (A) consisting of essentially stoichiometric amounts of a diamine of the formula I and isophthalic acid or an amide-forming derivative thereof with a mixture (C) consisting of essentially stoichiometric amounts of a diamine of the formula III and terephthalic acid or an amide-forming derivative thereof, wherein R' and R" are each hydrogen, $R_1$ to $R_4$ independently of one another are each hydrogen or methyl, $R_9$ is cycloalkyl having 5–8 ring C atoms, and $R_{10}$ and $R_{11}$ are each methyl or together are alkylene having 4–7 C atoms, the proportion of mixture (C) being 65–75 percent by weight, these weight percentages in the case of amide-forming derivatives of iso- or terephthalic acid relating to identical functional groups; and particularly copolyamides of the type mentioned wherein R' and R" are each hydrogen, $R_1$ and $R_4$ are each methyl, $R_2$ and $R_3$ are each hydrogen, $R_9$ is cyclopentyl, and $R_{10}$ and $R_{11}$ together are tetramethylene, or $R_9$ is cyclohexyl, and $R_{10}$ and $R_{11}$ together are pentamethylene, and the proportion of mixture (C) is 65–75 percent by weight.

Particularly preferred copolyamides are those which are obtained by reaction of a mixture (A) consisting of essentially stoichiometric amounts of a diamine of the formula Ia

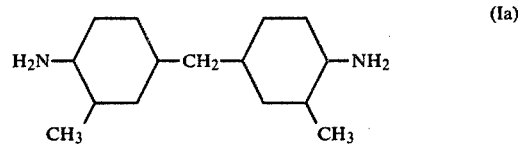

and isophthalic acid or terephthalic acid, or amide-forming derivatives thereof, or a mixture of isophthalic acid and terephthalic acid, or amide-forming derivatives thereof, in a molar ratio of isophthalic acid (derivative): terephthalic acid (derivative) of 5:5, with a mixture (B) consisting of essentially stoichiometric amounts of a diamine of the formula IIa

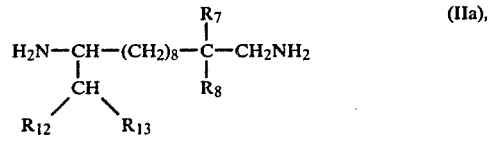

wherein $R_7$, $R_8$, $R_{12}$ and $R_{13}$ are each methyl or ethyl, and terephthalic acid or an amide-forming derivative thereof, the proportion of mixture (B) where $R_7$, $R_8$, $R_{12}$ and $R_{13}$ are each methyl being 60–75 percent by weight, and where $R_7$, $R_8$, $R_{12}$ and $R_{13}$ are each ethyl being 50–65 percent by weight, these weight percentages in the case of amide-forming derivatives of iso- or terephthalic acid relating to identical functional groups.

As amide-forming derivatives of terephthalic acid or of isophthalic acid acid, it is possible to use for example the corresponding dihalides, particularly the dichlorides, dinitriles, dialkyl esters or diaryl esters, especially dialkyl esters having 1–4 C atoms in each of the alkyl moieties, and diphenyl esters.

The reaction of the reaction components as defined can be performed by methods known per se. Production by the melt-polycondensation process in several stages is preferred. The diamines are in this case pre-condensed with essentially stoichiometric amounts of dicarboxylic acids as defined, in a closed vessel, optionally with the addition of water, under an inert gas and at temperatures of between about 240° and 290° C. It can be advantageous under certain circumstances to use the diamines and the dicarboxylic acids as salts; it is particularly advantageous to use terephthalic acid in the form of the salt, since the free acid without the addition of water dissolves only slowly in the course of the pre-condensation reaction and results in extended reaction times. This difficulty does not arise in the case of isophthalic acid, so that it can be used directly as such, that is to say, without the salt having to be formed. Preferably, the diamines of the formulae II and III are used as salts, and the diamine of the formula I and/or isophthalic acid are used in the free form. The salts to be used for pre-condensation are produced from essentially stoichiometric amounts of terephthalic acid or isophthalic acid and a diamine of the formula II or III in a suitable inert organic solvent. Suitable inert organic solvents are for example: cycloaliphatic alcohols, such as cyclopentanol and cyclohexanol, and especially aliphatic alcohols having up to 6 C atoms, such as methanol, ethanol, n-propanol, butanols, pentanols and hexanols, and also mixtures of such solvents with water. The pre-condensate can be subsequently further condensed at temperaures of between about 260° and 300° C., under normal pressure and in an inert-gas atmosphere, until the copolyamides according to the invention have been formed. It can be at times advantageous to apply a vacuum after completion of polycondensation in order to degas the polyamide.

The copolyamides according to the invention can be produced also by melt- or solvent-polycondensation of diamines of the formula I, II or III with essentially stoichiometric amounts of an activated ester of isophthalic acid or of terephthalic acid or of mixtures thereof. Suitable activated esters are in particular the corresponding diphenyl esters. The reaction temperatures are in general between about 230° and 300° C. This method of production is suitable in particular for copolyamides which are obtained by reaction of a mixture (A) with a mixture (B) wherein $R_6 \neq H$.

Customary additives, such as heat and light stabilisers, antioxidants, dyes, fameproofing agents, and so forth, can be added to the copolyamides according to the invention, either during production or during moulding.

The diamines of the formula I are known, or they can be produced by methods known per se. The diamines of the formulae II and III are novel. The diamines mentioned can be produced for example by reacting a compound of the formula IV

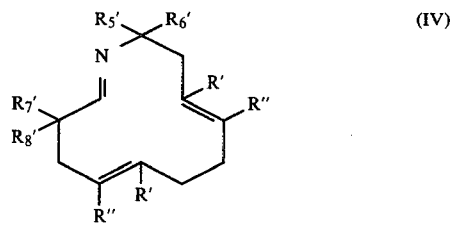

with a compound of the formula V

  (V)

to give a compound of the formula VIa

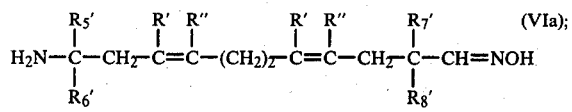

or by catalytically hydrogenating a compound of the formula IV to a compound of the formula VII

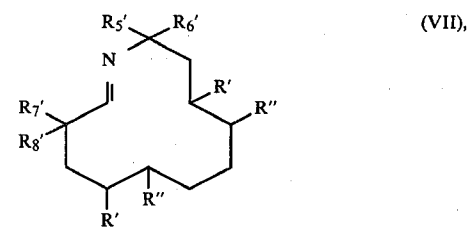

and reacting the compound of the formula VII with a compound of the formula V to give a compound of the formula VIb

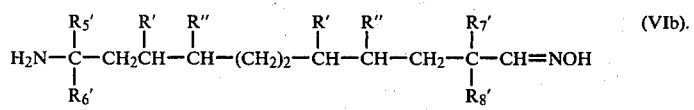

The compounds of the formulae VIa and VIb are subsequently catalytically hydrogenated to diamines of the formula II or III. In the above formulae IV to VII, R' and R" have the meanings given under the formulae II and III, $R_5'$, $R_6'$, $R_7'$ and $R_8'$ are the same groups as $R_5$, $R_6$, $R_7$ and $R_8$, or $R_5'$ is hydrogen, $R_6'$ is a group $R_9$, $R_7'$ is a group $R_{10}$, and $R_8'$ is a group $R_{11}$, where $R_9$, $R_{10}$ and $R_{11}$ have the meanings given under the formula III. The symbol X denotes the anion of an inorganic acid which does not oxidise under the reaction conditions, for example the anion of hydrochloric or hydrobromic acid or of sulfuric acid; and n is an integer corresponding to the valency of X. Instead of using the hydroxylamine salts of the formula V, it is also possible to use hydrazines, such as phenylhydrazine or hydrazine hydrate, benzylamine or semicarbazide, or salts thereof with inorganic acids. There are formed then as intermediates of the formula VIa or VIb the corresponding hydrazones, benzylamines or semicarbazones. The reaction of the compounds of the formulae IV and VII with the compound of the formula V is advantageously performed in an aqueous medium, and with the addition of an inorganic acid not oxidising under the reaction conditions, such as dilute HCl or sulfuric acid. The hydrogenation reactions are advantageously performed in the presence of suitable inert organic solvents, such as cycloaliphatic hydrocarbons, cyclic ethers or alcohols, particularly cyclohexane, tetrahydrofuran and methanol, and with the use of hydrogenation catalysts known per se. Suitable catalysts are, depending on the compound to be hydrogenated, platinum, rhodium, palladium, ruthenium, rhodium/aluminium oxide or nickel catalysts.

Compounds of the formula III wherein $R_9$ is unsubstituted or substituted cycloalkyl can be produced also by catalytical hydrogenation of the corresponding diamines of the formula III wherein $R_9$ is unsubstituted or substituted phenyl.

The starting products of the formula V are known. The compounds of the formula IV can be produced, in a manner analogous to that described in Helv. Chem. Acta, 61, Fasc.3, 1122–1124 (1978), by nickel-catalysed co-oligomerisation of 2-aza-1,3-butadienes of the formula VIII

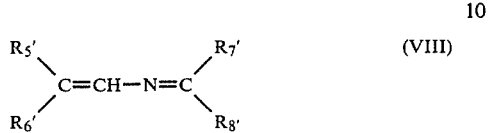

with compounds of the formula IX

wherein R', R'', $R_5'$, $R_6'$, $R_7'$ and $R_8'$ have the meanings already defined. Suitable catalyst systems are described for example in the German Offenlegungsschrift No. 2,330,087. The 2-aza-1,3-butadienes of the formula VIII are known, or they can be produced by methods analogous to those described in the literature [see for example Zhurnal Organicheskoi Khimii, 6, No. 11, 2197–99 (1970); Izw. Adad. Nauk SSSR, Ser. Khim., No. 9, 2038–2045 (1975); Tetrahedron, 34, 833–839 (1978); J. Org. Chem., 43, 782–784 (1978); U.S. Pat. Nos. 2,319,848 and 3,706,802].

The copolyamides according to the invention have a transparent appearance and high glass transition temperatures, but can nevertheless be very readily thermoplastically processed, for example by the injection moulding process or extrusion process. They are distinguished also by low water absorption, good stability to hydrolysis, resistance to boiling water, and negligible impairment of the mechanical and electrical properties by the action of moisture.

The copolyamides according to the invention can be processed, by methods known per se, into transparent moulded articles of the widest variety, such as transparent apparatus and parts of apparatus.

EXAMPLE 1

Production of salts from terephthalic acid or isophthalic acid and 1,11-diaminoundecanes of the formula II or III In a round-bottomed flask fitted with stirrer, reflux condenser and dropping funnel, 0.1 mol of terephthalic acid or isophthalic acid in 300 ml of 70% ethanol is heated to boiling. There is then introduced into the boiling suspension from the dropping funnel, with stirring, 0.1 mol of a diamine of the formula II or III in the course of about 10 minutes, and any diamine residues adhering to the funnel are quantitatively washed with some ethanol into the reaction mixture. The clear solution thus formed is allowed to cool with continuous stirring; the salt which has precipitated is filtered off and then dried at 90° C. in vacuo.

The following salts were produced by this method:

| Designation | Composition | Yield (% of theory) |
|---|---|---|
| salt A | 1-ethyl-10,10-dimethyl-1,11-diaminoundecane/TPA, | 86 |
| salt B | 1-isopropyl-10,10-dimethyl-1,11-diaminoundecane/TPA, | 78 |
| salt C | 1-phenyl-10,10-dimethyl-1,11-diaminoundecane/TPA, | 92 |
| salt D | 1-phenyl-10-methyl-1,11-diaminoundecane/TPA, | 96 |
| salt E | 1-cyclohexyl-10,10-dimethyl-1,11-diaminoundecane/TPA, | 89 |
| salt F | 1-(3-pentyl)-10,10-diethyl-1,11-diaminoundecane/TPA, | 98 |
| salt G | 1-(2-pentyl)-10-methyl-10-n-propyl-1,11-diaminoundecane/TPA, | 96 |
| salt H | 1,10-diethyl-10-n-butyl-1,11-diaminoundecane/TPA, | 93 |
| salt I | 1-(3-heptyl)-10-ethyl-10-n-butyl-1,11-diaminoundecane/TPA, | 98 |
| salt K | 1-cyclohexyl-10-pentamethylene-1,11-diaminoundecane/TPA, | 97 |
| salt L | 1-cyclohexyl-10-pentamethylene-1,11-diaminoundecane/IPA, | 72 |
| salt M | 1-cyclopentyl-10-tetramethylene-1,11-diaminoundecane/TPA, | 95 |
| salt N | 1-phenyl-10,10-diethyl-1,11-diaminoundecane/TPA, | 88 |
| salt O | 1-phenyl-10-ethyl-10-n-butyl-1,11-diaminoundecane/TPA, | 98 |
| salt P | 1-(3-pentyl)-10-methyl-1,11-diaminoundecane/TPA, | 93 |
| salt Q | 1-n-hexyl-10,10-dimethyl-1,11-diaminoundecane/TPA, and | 89 |
| salt R | 1-(3-pentyl)-3,(4),7(8),10-trimethyl-1,11-diaminoundecane/TPA. | 94 |

TPA = terephthalic acid
IPA = isophthalic acid

EXAMPLES 2–26

The following components are weighed into a bomb tube fitted with a screw cover and with an incorporated high-pressure relief valve:

(a) 4,4'-diamino-3,3'-diamethyldicyclohexylmethane,
(b) an amount of isophthalic acid equivalent to this diamine, an equivalent amount of a mixture of iso- and terephthalic acid or of terephthalic acid alone,
(c) one or more of the salts, listed in Example 1, from a diamine of the formula II or III and terephthalic acid or isophthalic acid.

After the air in the bomb tube has been completely expelled by nitrogen or by another inert gas, the bomb tube is closed and is immersed in a salt bath, the temperature of which is 270° C. A homogeneous transparent melt has formed after 30 to 60 minutes. After an overall time of 3 hours, pre-condensation is discontinued by removing the bomb tube from the salt bath and releasing the excess pressure by opening the valve. The solidified transparent pre-condensate is taken from the bomb tube and transferred to a condensation vessel. With the strict exclusion of air and the continuous passing through of nitrogen, the melt is polycondensed for 5 hours at a salt-bath temperature of 280° C., in the course of which the reaction water is continuously removed by the flow of nitrogen. The melt on cooling solidifies to form a transparent substance.

In each case, 2–3 g of the copolyamides produced is moulded, in a heatable hydraulic pressure at 270° C., into a sheet having a thickness of about 0.4 to 1 mm. In order to determine the water absorption, the sheets are exposed at room temperature (20–25° C.) to a relative humidity of 65% until equilibrium has been established, that is to say, until no further increase in weight can be detected. Depending on the thickness of sheet, the time necessary for this varies between about 10 and 60 days.

In Table 1 are given the composition and properties of the copolyamides. With regard to the composition, there is given the proportion of salt formed from terephthalic acid and/or isophthalic acid and a diamine of the formula II or III in percent by weight, relative to the total weight of all components used. The difference with respect to 100 percent by weight is made up of an equimolar mixture of 4,4'-diamino-3,3'-dimethyldicyclohexylmethane and isophthalic acid, except where otherwise stated.

The reduced viscosity $\eta$ red.=rel.−1/c is based on measurements on a 0.5% solution of the copolyamides in m-cresol at 25° C. The glass transition temperatures were measured in a differential calorimeter (DSC). Regarding the values for water absorption, these are saturation values at room temperaure. The resistance of the transparency to boiling water is very good for all the copolyamides, that is to say, no impairment of the transparency can be detected even after several days.

TABLE 1

| Ex.-ample No. | Salt addition | wt. % | $\eta$red. dl/g | Glass transition temperature °C. | Water absorption with 65% rel.humidity (wt. %) | Resistance to boiling water |
|---|---|---|---|---|---|---|
| 2 | salt B | 62 | 1.02 | 172 | 1.9 | very good |
| 3 | salt B | 70 | 1.09 | 162 | 1.7 | Very good |
| 4[1] | salt B | 66 | 1.21 | 171 | 1.8 | very good |
| 5 | salt F | 53 | 0.88 | 172 | 1.7 | very good |
| 6 | salt F | 57 | 0.97 | 167 | 1.6 | very good |
| 7 | salt F | 62 | 0.95 | 159 | 1.4 | very good |
| 8 | salt H | 50 | 0.91 | 166 | 1.6 | very good |
| 9 | salt A | 60 | 1.10 | 166 | 1.8 | very good |
| 10 | salt D | 66 | 0.82 | 162 | 1.6 | very good |
| 11 | salt C | 74 | 1.05 | 160 | 1.5 | very good |
| 12 | salt K | 68 | 0.78 | 172 | 1.3 | very good |
| 13 | salt K | 70 | 1.09 | 166 | 1.2 | very good |
| 14 | salt E | 71 | 0.92 | 172 | 1.4 | very good |
| 15 | salt G | 65 | 0.87 | 159 | 1.4 | very good |
| 16 | salt L | 68 | 0.88 | 158 | 1.2 | very good |
| 17 | salt M | 68 | 0.98 | 168 | 1.3 | very good |
| 18 | salt I | 52 | 0.85 | 161 | 1.5 | very good |
| 19 | salt N | 65 | 1.02 | 156 | 1.2 | very good |
| 20 | salt O | 60 | 0.72 | 158 | 1.2 | very good |
| 21 | salt P | 65 | 0.81 | 163 | 1.5 | very good |
| 22 | salt Q | 65 | 0.87 | 145 | 1.4 | very good |
| 23 | salt R | 63 | 0.67 | 160 | 1.4 | very good |
| 24 | salt B[2] | 66 | 1.57 | 167 | 1.6 | very good |
| 25 | salt B[2] | 70 | 1.07 | 164 | 1.5 | very good |

TABLE 1-continued

| Ex.-ample No. | Salt addition | wt. % | $\eta$red. dl/g | Glass transition temperature °C. | Water absorption with 65% rel.humidity (wt. %) | Resistance to boiling water |
|---|---|---|---|---|---|---|
| 26 | salt B[2] | 75 | 0.92 | 156 | 1.3 | very good |

[1]The amount of acid equivalent to 4,4'-diamino-3,3'dimethyldicyclohexylmethane consists in this example of a 1:1 mixture of iso- and terephthalic acid.
[2]The amount of dicarboxylic acid equivalent to 4,4'-diamino-3,3'-dimethyldicyclohexylmethane consists in these cases only of terephthalic acid.

In all other cases, the amount of acid equivalent to 4,4'-diamino-3,3'-dimethyldicyclohexylamine consists of isophthalic acid.

EXAMPLE 27

3.506 g of 1,1,10,10-tetramethyl-1,11-diaminoundecane,
4.585 g of terephthalic acid diphenyl ester,
2.431 g of 4,4'-diamino-3,3'-dimethyldicyclohexylmethane and
3.245 g of isophthalic acid diphenyl ester
are sealed into a glass vessel and heated under nitrogen for 16 hours at 210° C. The contents are then transferred to an open condensation vessel, and polycondensed under nitrogen, firstly for two hours under normal pressure at 270° C. and then for two hours in vacuo. The resulting polyamide has the follosing physical properties:
$\eta$red.: 0.76 dl/g (0.5%, m-cresol);
Tg: 148° C.
Water absorption: 1.6 percent by weight with 65% rel. humidity.
Resistance to boiling water: very good.

EXAMPLE 28

2.729 g of 1-pentamethylene-10,10-dimethyl-1,11-diaminoundecane,
3.056 g of terephthalic acid diphenyl ester,
1.21 g of 4,4'-diamino-3,3'-dimethyldicyclohexylmethane and
1.615 g of isophthalic acid diphenyl ester
are condensed to a polyamide under conditions the same as those described in Example 27. The polyamide obtained has the following properties:
$\eta$red.: 0.82 dl/g (0.5%, m-cresol9; Tg: 168° C.
Water absorption: 1.2 percent by weight with 65% rel. humidity.
Resistance to boiling water: very good.

EXAMPLE 29

2.639 g of 2,2-bis-(4-aminocyclohexyl)-propane,
1.837 g of isophthalic acid and
10.439 g of salt B
are condensed to a polyamide under the conditions described in Example 2, with the exception that precondensation is performed at 300° C. The polyamide obtained has the following properties:
$\eta$red.: 0.79 dl/g (0.5%, m-cresol); Tg: 158° C.
Water absorption: 1.8 percent by weight with 65% rel. humidity.
Resistance to boiling water: very good.

EXAMPLE 30

2.078 kg of 1-isopropyl-10,10-dimethyl-1,11-diaminoundecane, 1.067 kg of 4,4'-diamino-3,3'-dimethyldicyclohexylmethane, 1.355 kg of terephthalic acid, 0.743 kg of isophthalic acid and 0.026 kg of di-tert-butyl-p-cresol are weighed into an autoclave. After the air has been expelled from the autoclave by repeated evacuation and refilling with nitrogen, the autoclave is sealed and the heating is adjusted to 260° C. After 1.5 hours, a product temperature of 245° C. has been attained, and a pressure of 2 to 3 cars established. The stirrer is then brought into operation. As a result of the commencing condensation reaction, there occurs a vigorous evolution of water vapour, and the pressure rises within about 15 minutes to 8–9 bars. The pressure is maintained constant for one hour at this level by releasing water vapour from time to time through a valve. The pressure is then lowered in the course of 30 minutes to normal pressure, and stirring is continued for 5 hours under a gentle stream of nitrogen. The temperature is regulated so that during this time the product temperature does not exceed 280° C. In order to degas the melt, the autoclave is put under vacuum for a further 15 minutes. The stirrer is then switched off; the product temperature is adjusted to 290° C., and the melt is pressed out, under an excess pressure of 4 bars of $N_2$, through the bottom valve, and is directly granulated. The polyamide obtained has the following properties:

$\eta$red.: 0.98 dl/g (0.5%, m-cresol); Tg: 170° C.; and water absorption: 1.8 percent by weight with 65% relative humidity.

The diamines of the formulae II and III used in the above Examples can be produced as follows:

Production method A

1-Isopropyl-10,10-dimethyl-1,11-diaminoundecane 2.57 g (0.01 mol) of nickel acetylacetonate and 1.66 g (0.01 mol) of triethyl phosphite are dissolved in 120 g of absolute toluene under protective gas (argon), whereupon the solution is saturated at 20°–25° C. with 1,3-butadiene. There is subsequently slowly added dropwise, whilst a weak flow of 1,3-butadiene is being introduced, 3.9 g (0.03 mol) of ethoxy-diethylaluminium. The mixture is heated to 60° C. and, as a strong flow of 1,3-butadiene is being fed in, 122.5 g (0.98 mol) of N-isobutylidene-2-methylpropenylamine [produced by reaction of isobutyraldehyde with ammonia according to J. Org. Chem., 26, 1822–25 (1961)] is added dropwise, within 45 minutes, in such a manner that the introduced butadiene is exactly all used up. After completion of the dropwise addition, stirring is maintained for one further hour at 60° C., with the continuous feeding in of 1,3-butadiene, and the temperature is then lowered to 20°–50° C. The catalyst is inactivated by the addition of 0.32 g (0.01 mol) of sulfur, and the reaction solution is distilled. Subsequent fine distillation yields 212.5 g (0.912 mol) of 3,3-dimethyl-12-isopropyl-1-aza-1,5,9-cyclododecatriene; b.p. 54°–55° C./1.33 Pa; $n_D^{20}=1.4832$.

233.4 g (1 mol) of 3,3-dimethyl-12-isopropyl-1-aza-1,5,9-cyclododecatriene is added dropwise to 100 g of 37% hydrochloric acid and 200 ml of water in the course of one hour, in a manner ensuring that the temperature does not exceed 80° C. The mixture is then cooled to 20°–50° C., and 69.5 g (1.0 mol) of hydroxylamine hydrochloride is added. There is subsequently added during one hour, while cooling with a water bath, about 92 g (2.3 mols) of solid sodium hydroxide until the pH value of the aqueous solution is 10–11. The organic phase which precipitates is separated, and washed free from salt with water. Distillation yields 245 g (0.92 mol) of 2,2-dimethyl-11-isopropyl-11-aminoundeca-4,8-dienal-oxime; b.p. 158°–162° C./4 Pa; $n_D^{20}=1.4930$.

490 g (1.84 mols) of 2,2-dimethyl-11-isopropyl-11-aminoundeca-4,8-dienal-oxime is dissolved in 2.4 liters of methanol, and the solution is transferred, together with about 200 g of liquid ammonia, with the addition of 150 g of Raney nickel, to a 6.3-liter steel autoclave. Hydrogen is subsequently injected to give a pressure of 100 bars, and the temperature is raised to 100° C. as stirring is maintained. Hydrogenation is performed for about 5 hours under these conditions; the mixture is then cooled, and the ammonia and excess hydrogen are released. Subsequent distillation under high vacuum yields 436 g (1.705 mols) of 1-isopropyl-10,10-dimethyl-1,11-diaminoundecane in the form of colourless liquid as clear as water; b.p. 87° C./4 Pa; $n_D^{20}=1.4619$.

1-Ethyl-10,10-dimethyl-1,11-diaminoundecane

Reaction of N-pyropylidene-(2-methylpropenylamine) [produced by isomerisation of isobutylidene-allylamine in the presence of potassium-tert-butylate; b.p. 122° C.; $n_D^{20}=1.471$] with 1,3-butadiene to 3,3-dimethyl-12-ethyl-1-aza-1,5,9-cyclododecatriene; b.p. 65°–66° C./0.7 Pa; $n_D^{20}=1.4864$.

Reaction of 3,3-dimethyl-12-ethyl-1-aza-1,5,9-cyclododecatriene with hydroxylamine sulfate, in the presence of sulfuric acid, to 2,2-dimethyl-11-ethyl-11-aminoundeca-4,8-dienal-oxime, and hydrogenation of this to give 1-ethyl-10,10-dimethyl-1,11-diaminoundecane; b.p. 93° C./7 Pa; $n_D^{20}=1.4622$.

1-Phenyl-10,10-dimethyl-1,11-diaminoundecane

Reaction of N-benzylidene-(2-methylpropenylamine) [produced by reaction of benzaldehyde with methallylamine and subsequent isomerisation, in the presence of potassium tert-butylate; b.p. 65°–66° C./7 Pa; $n_D^{20}=1.5836$] with 1,3-butadiene to give 3,3-dimethyl-12-phenyl-1-aza-1,5,9-cyclododecatriene; b.p. 128°–130° C./4 Pa; m.p. 66°–68° C.

Reaction of 3,3-dimethyl-12-phenyl-1-aza-1,5,9-cyclododecatriene with hydroxylamine sulfate, in the presence of hydrochloric acid and water, to 2,2-dimethyl-11-phenyl-11-amino-undeca-4,8-dienal-oxime, and hydrogenation of this to give 1-phenyl-10,10-dimethyl-1,11-diaminoundecane; b.p. 150° C./3 Pa; $n_D^{20}=1.5054$.

1-Phenyl-10-methyl-1,11-diaminoundecane

Reaction of N-benzylidene-propenylamine with 1,3-butadiene to 3-methyl-12-phenyl-1-aza-1,5,9-cyclododecatriene (cis/trans isomeric mixture 65:35); b.p. 112°–113° C./1 Pa; $n_D^{20}=1.5505$.

Reaction of 3-methyl-12-phenyl-1-aza-1,5,9-cyclododecatriene with hydroxylamine hydrochloride, in the presence of hydrochloric acid and water, to 2-methyl-11-phenyl-11-amino-undeca-4,8-dienal-oxime, and hydrogenation of this to give 1-phenyl-10-methyl-1,11-diaminoundecane; b.p. 138°–140° C./1 Pa; $n_D^{20}=1.5095$.

1-Cyclohexyl-10,10-dimethyl-1,11-diaminoundecane

Hydrogenation of 1-phenyl-10,10-dimethyl-1,11-diaminoundecane in the presence of a ruthenium/charcoal catalyst; b.p. 147° C./4 Pa; $n_D^{20}=1.4805$.

1-Phenyl-10,10-diethyl-1,11-diaminoundecane

Reaction of 1-phenyl-4,4-diethyl-2-aza-1,3-butadiene [produced by reaction of benzylamine with 2-ethylbutenal and subsequent isomerisation, in the presence of potassium tert-butylate; b.p. 70° C./7 Pa; $n_D^{20} = 1.5598$; see J. Org. Chem., 43, No. 4, 782–84 (1978)] with 1,3-butadiene to give 3,3-diethyl-12-phenyl-1-aza-1,5,9-cyclododecatriene; b.p. 105° C./4 Pa; $n_D^{20} = 1.5369$.

Reaction of 3,3-diethyl-12-phenyl-1-aza-1,5,9-cyclododecatriene with hydroxylamine hydrochloride, in the presence of hydrochloric acid and water, to 2,2-diethyl-11-phenyl-11-amino-undeca-4,8-dienal-oxime, and hydrogenation of this to yield 1-phenyl-10,10-diethyl-1,11-diaminoundecane; b.p. 146° C./2 Pa; $n_D^{20} = 1.5090$.

1Phenyl-10-ethyl-10-n-butyl-1,11-diaminoundecane

Reaction of 1-phenyl-4-ethyl-4-n-butyl-2-aza-1,3-butadiene [produced by reaction of benzylamine with 2-ethyl-hexenal, and subsequent isomerisation, in the presence of potassium tert-butylate; b.p. 90° C.[7 Pa; $n_D^{20} = 1.5630$] with 1,3-butadiene to 3-ethyl-3-n-butyl-12-phenyl-1-aza-1,5,9-cyclododecatriene; b.p. 130° C./2 Pa; $n_D^{20} = 1.5296$.

Reaction of 3-ethyl-3-n-butyl-12-phenyl-1-aza-1,5,9-cyclododecatriene with hydroxylamine hydrochloride, in the presence of hydrochloric acid and water, to 2-ethyl-2-n-butyl-11-phenyl-11-amino-undeca-4,8-dienal-oxime, and hydrogenation of this to yield 1-phenyl-10-ethyl-10-n-butyl-1,11-diaminoundecane; b.p. 155°–158° C./5 Pa; $n_D^{20} = 1.5045$.

1-Pentamethylene-10,10-dimethyl-1,11-diaminoundecane

Reaction of N-cyclohexylidene-(2-methylpropenylamine) [produced by reaction of cyclohexanone with methallylamine, and subsequent isomerisation, in the presence of potassium-tert-butylate; b.p. 96° C./1700 Pa; $n_D^{20} = 1.5160$] with 1,3-butadiene to 3,3-dimethyl-12-pentamethylene-1-aza-1,5,9-cyclododecatriene; b.p. 96° C./4 Pa; $n_D^{20} = 1.5116$.

Reaction of 3,3-dimethyl-12-pentamethylene-1-aza-1,5,9-cyclododecatriene with hydroxylamine hydrochloride, in the presence of hydrochloric acid and water, to 2,2-dimethyl-11-pentamethylene-11-amino-undeca-4,8-dienaloxime, and hydrogenation of this to give 1-pentamethylene-10,10-dimethyl-1,11-diaminoundecane; b.p. 112° C./4 Pa; $n_D^{20} = 1.4833$.

1-(3-Pentyl)-10-methyl-1,11-diaminoundecane

Reaction of N-(2-ethyl)-buten-2-ylidene-propenylamine [produced by reaction of 2-ethyl-butenal with allylamine, and subsequent isomerisation, analogously to Zhurnal Organischeskoi Khimii, 6, No. 11, 2197–9 (1970); b.p. 70° C./1700 Pa; $n_D^{20} = 1.5227$] with 1,3-butadiene to 3-methyl-12-(3-penten-2-yl)-1-aza-1,5,9-cyclododecatriene; b.p. 100° C./4 Pa; $n_D^{20} = 1.5056$.

Reaction of 3-methyl-12-(3-penten-2-yl)-1-aza-1,5,9-cyclododecatriene with hydroxylamine sulfate, in the presence of hydrochloric acid and water, to 2-methyl-11-(3-penten-2-yl)-11-amino-undeca-4,8-dienal-oxime, and hydrogenation of this to obtain 1-(3-pentyl)-10-methyl-1,11-diaminoundecane; b.p. 115° C./5 Pa; $n_D^{20} = 1.4662$.

1-n-Hexyl-10,10-dimethyl-1,11-diaminoundecane

Reaction of 1-n-hexyl-4,4-dimethyl-2-aza-1,3-butadiene [produced by reaction of heptanal with methallylamine, and subsequent isomerisation, in the presence of potassium-tert-butylate; b.p. 54° C./5 Pa; $n_D^{20} = 1.4662$] with 1,3-butadiene to 3,3-dimethyl-12-n-hexyl-1-aza-1,5,9-cyclododecatriene; b.p. 100° C./4 Pa; $n_D^{20} = 1.4841$.

Reaction of 3,3-dimethyl-12-n-hexyl-1-aza-1,5,9-cyclododecatriene with hydroxylamine sulfate, in the presence of hydrochloric acid and water, to 2,2-dimethyl-11-n-hexyl-11-amino-undeca-4,8-dienal-oxime, and hydrogenation of this to given 1-n-hexyl-10,10-dimethyl-1,10-diaminoundecane; b.p. 135° C./4 Pa; $n_D^{20} = 1.4624$.

1-(3-Pentyl)-3(4),7(8),10-trimethyl-1,11-diaminoundecane

Reaction of N-(2-ethyl)-buten-2-ylidene-propenylamine with isoprene to 3,5(6),9(10)-trimethyl-12-(3-penten-2-yl)-1-aza-1,5,9-cyclododecatriene; b.p. 108°–110° C./5 Pa; $n_D^{20} = 1.5078$.

Reaction of the stated 1-aza-1,5,9-cyclododecatriene with hydroxylamine sulfate, in the presence of hydrochloric acid and water, to 2,4(5),8(9)-trimethyl-11-(3-penten-2-yl)-11-amino-undeca-4,8-dienyl-oxime, and hydrogenation of this to give 1-(3-pentyl-3(4),7(8),10-trimethyl-11-diaminoundecane; b.p. 117° C./2 Pa; $n_D^{20} = 1.4731$.

1,1,10,10-tetramethyl-1,11-diaminoundecane

Reaction of N-isopropylidene-(2-methylpropenylamine) [produced by reaction of acetone with methallylamine and subsequent isomerisation of the reaction product; b.p. 89°–90° C.; $n_D^{20} = 1.4762$] with 1,3-butadiene to 3,3,12,12-tetramethyl-1-aza-1,5,9-cyclododecatriene; b.p. 58° C./4 Pa; $n_D^{20} = 1.4858$.

Reaction of 3,3,12,12-tetramethyl-1,11-diaminoundecane with hydroxylamine sulfate, in the presence of hydrochloric acid and water, to 2,2,11,11-tetramethyl-11-amino-undeca-4,8-dienal-oxime, and hydrogenation of this to give 1,1,10,10-tetramethyl-1,11-diaminoundecane; b.p. 92° C./5 Pa; $n_D^{20} = 1.4590$.

Production Method B

1-Isopropyl-10,10-dimethyl-1,11-diaminoundecane 466.8 g (2 mols) of 3,3-dimethyl-12-isopropyl-1-aza-1,5,9-cyclododecatriene is dissolved in 4 liters of cyclohexane, and the solution is hydrogenated at 20°–25° C. under an initial pressure of 100 bars, in the presence of 80 g of rhodium/aluminium oxide, for 4 hours in a steel autoclave. The solvent is then distilled off to obtain, as main fraction, 425 g (1.79 mols) of 3,3-dimethyl-12-isopropyl-1-aza-cyclododecene; b.p. 92°–94° C./4 Pa; $n_D^{20} = 1.4706$.

Reaction of 3,3-dimethyl-12-isopropyl-1-aza-cyclododecene with hydroxylamine hydrochloride, in the presence of hydrochloric acid and water, to 2,2-dimethyl-11-isopropyl-11-amino-undecanal-oxime; b.p. 145° C./4 Pa; $n_D^{20} = 1.4761$.

Hydrogenation of 2,2-dimethyl-11-isopropyl-11-aminoundecanal-oxime, analogously to the method described under (A), to give 1-isopropyl-10,10-dimethyl-1,11-diaminoundecane.

1,10-diethyl-10-n-butyl-1,11-diaminoundecane

Reaction of N-propylidene-(2-ethyl-hexen-1-yl-amine) [produced by isomerisation of (2-ethyl-hexylidene)-allylamine, in the presence of potassium tert-butylate; b.p. 53°–56° C./133 Pa; $n_D^{20} = 1.4698$] with 1,3-butadiene to 3,12-diethyl-3-n-butyl-1-aza-1,5,9-cyclododecatriene (isomeric mixture); b.p. 98°–100° C./40 Pa; $n_D^{20} = 1.4905$, and hydrogenation to 3-n- butyl-3,12-diethyl-1-aza-cyclododecene; b.p. 110° C./7 Pa.

Reaction of 3-n-butyl-3,12-diethyl-1-aza-cyclododecene with hydroxylamine sulfate, in the presence of hydrochloric acid and water to 2-n-butyl-2,11-diethyl-11-amino-undecanaloxime, and hydrogenation of this to give 1,10-diethyl-10-n-butyl-1,11-diaminoundecane; b.p. 128°–130° C./5 Pa; $n_D^{20}=1.4630$.

1-(3-Pentyl)-10,10-diethyl-1,11-diaminoundecane

Reaction of 1-(3-pentyl)-4,4-diethyl-2-aza-1,3-butadiene [produced by reaction of 2-ethylbutyraldehyde with ammonia according to U.S. Pat. No. 2,319,848] with 1,3-butadiene to 3,3-diethyl-12-(3-pentyl)-1-aza-1,5,9-cyclododecatriene (b.p. 90°–92° C./0.13 Pa; $n_D^{20}=1.4840$), and hydrogenation to obtain 3,3-diethyl-12-(3-pentyl)-1-aza-cyclododecene; b.p. 95° C./4 Pa.

Reaction of 3,3-diethyl-12-(3-pentyl)-1-aza-cyclododecene with hydroxylamine sulfate, in the presence of hydrochloric acid and water, to 2,2-diethyl-11-(3-pentyl)-11-amino-undecanal-oxime ($n_D^{20}=1.4637$), and hydrogenation of this to give 1-(3-pentyl)-10,10-diethyl-1,11-diaminoundecane; b.p. 133°–135° C./3 Pa; $n_D^{20}=1.4704$.

1-(2-Pentyl)-10-methyl-10-n-propyl-1,11-diaminoundecane

Reaction of N-2-methyl-pentylidene-(2-methyl-penten-1-yl-amine) (produced by reaction of 2-methyl-valeraldehyde with ammonia according to U.S. Pat. No. 2,319,848] with 1,3-butadiene to 3-methyl-3-n-propyl-12-(2-pentyl)-1-aza-1,5,9-cyclododecatriene (isomeric mixture; b.p. 103°–105° C./40 Pa; $n_D^{20}=1.4886$), and hydrogenation to 3-methyl-3-n-propyl-12-(2-pentyl)-1-azacyclododecene; b.p. 125° C./53 Pa.

Reaction of 3-methyl-3-n-propyl-12-(2-pentyl)-1-azacyclododecene with hydroxylamine sulfate, in the presence of hydrochloric acid and water, to 2-methyl-2-n-propyl-11-(2-pentyl)-11-amino-undecanal-oxime, and hydrogenation of this to give 1-(2-pentyl)-10-methyl-10-n-propyl-1,11-diaminoundecane; b.p. 140°–142° C./3 Pa; $n_D^{20}=1.4665$.

1-(3-Heptyl)-10-n-butyl-10-ethyl-1,11-diaminoundecane

Reaction of N-2-ethyl-hexylidene-(2-ethylhexen-1-ylamine) [produced by reaction of 2-ethylcaproaldehyde with ammonia] with 1,3-butadiene to 3-ethyl-3-n-butyl-12-(3-heptyl)-1-aza-1,5,9-cyclododecatriene (7:3 isomeric mixture; b.p. 106°–109° C./13 Pa; $n_D^{20}=1.4895$), and hydrogenation to obtain 3-n-butyl-3-ethyl-12-(3-heptyl)-1-azacyclododecene; b.p. 130° C./4 Pa.

Reaction of 3-n-butyl-3-ethyl-12-(3-heptyl)-1-azacyclododecene with hydroxylamine sulfate, in the presence of hydrochloric acid and water, to 2-n-butyl-2-ethyl-11-(3-heptyl)-11-amino-undecanal-oxime, and hydrogenation of this to give 1-(3-heptyl)-10-n-butyl-10-ethyl-1,11-diaminoundecane; b.p. 156°–160° C./4 Pa; $n_D^{20}=1.4672$.

1-Cyclohexyl-10-pentamethylene-1,11-diaminoundecane

Reaction of N-cyclohexylmethylidene-(cyclohexylidenemethylamine) [produced by reaction of cyclohexanealdehyde with ammonia; b.p. 83° C./4 Pa; $n_D^{20}=1.5260$] with 1,3-butadiene to 3-pentamethylene-12-cyclohexyl-1-aza-1,5,9-cyclododecatriene (b.p. 140° C./3 Pa; $n_D^{20}=1.5191$), and hydrogenation of 3-pentamethylene-12-cyclohexyl-1-aza-1,5,9-cyclododecatriene to 3-pentamethylene-12-cyclohexyl-1-aza-cyclododecene; b.p. 140°–142° C./3 Pa; $n_D^{20}=1.4982$.

Reaction of 3-pentamethylene-12-cyclohexyl-1-azacyclododecene with hydroxylamine hydrochloride to 2-pentamethylene-11-cyclohexyl-11-amino-undecanal-oxime, and hydrogenation of this to give 1-cyclohexyl-10-pentamethylene-1,11-diaminoundecane; b.p. 166°–170° C./3 Pa; $n_D^{20}=1.4975$.

1-Cyclopentyl-10-tetramethylene-1,11-diaminoundecane

Reaction of N-cyclopentylmethylidene-(cyclopentylidenemethylamine) [production analogously to U.S. Pat. No. 2,319,848; b.p. 125° C./186×10³ Pa; $n_D^{20}=1.5245$] with 1,3-butadiene to 3-tetramethylene-12-cyclopentyl-1-aza-1,5,9-cyclododecatriene (b.p. 120° C./1 Pa), and hydrogenation of 3-tetramethylene-12-cyclopentyl-1-aza-1,5,9-cyclododecatriene to 3-tetramethylene-12-cyclopentyl-1-aza-cyclododecene; b.p. 130° C./7 Pa.

Reaction of 3-tetramethylene-12-cyclopentyl-1-azacyclododecene with hydroxylamine sulfate to 2-tetramethylene-11-cyclopentyl-11-amino-undecanal-oxime, and hydrogenation of this to give 1-cyclopentyl-10-tetramethylene-1,10-diaminoundecane; b.p. 166°–168° C./5 Pa; $n_D^{20}=1.4922$.

What is claimed is:

1. A transparent copolyamide having a reduced specific viscosity of at least 0.5 dl/g, measured on a 0.5% solution of m-cresol at 25° C., which copolyamide is obtained by reaction of a mixture (A) consisting of essentially stoichiometric amounts of a diamine of the formula I

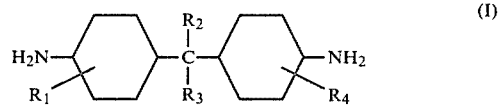

and isophthalic acid or terephthalic acid, or amide-forming derivatives thereof, or a mixture of isophthalic acid and terephthalic acid, or amide-forming derivatives thereof, either with a mixture (B) consisting of essentially stoichiometric amounts of a diamine of the formula II

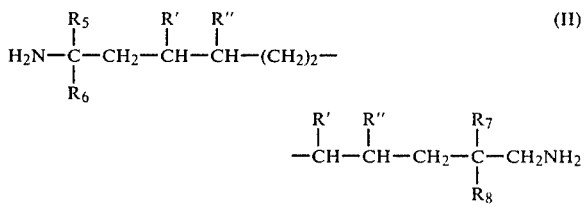

and terephthalic acid or an amide-forming derivative thereof, or a mixture of terephthalic acid and isophthalic acid, or amide-forming derivatives thereof, in a molar ratio of terephthalic acid, or amide-forming derivative: isophthalic acid, or amide-forming derivative, of 8:2 to 10:0, or with a mixture (C) consisting of essentially stoichiometric amounts of a diamine of the formula III

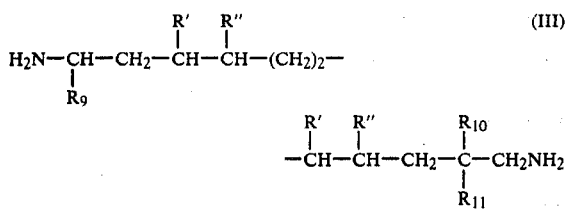

and terephthalic acid or isophthalic acid, or mixtures or amide-forming derivatives thereof, wherein R' and R" independently of one another are each hydrogen or methyl, $R_1$ to $R_4$ independently of one another are each hydrogen or alkyl having 1–4 C atoms, $R_5$ is alkyl having 1–12 C atoms, aryl having 6–10 C atoms, or said aryl substituted by alkyl having 1–4 C atoms, $R_6$ is hydrogen or alkyl having 1–6 C atoms, or $R_5$ and $R_6$ together are alkylene having 4–7 C atoms, $R_7$ is alkyl having 1–8 C atoms, $R_8$ is hydrogen or alkyl having 1–5 C atoms, $R_9$ is cycloalkyl which has 5–12 ring C atoms and which is unsubstituted or substituted by alkyl of 1–4 C atoms, $R_{10}$ is hydrogen or methyl, and $R_{11}$ is methyl, or $R_{10}$ and $R_{11}$ together are alkylene having 4–11 C atoms, the proportion of mixture (C) being 60–80 percent by weight, based on the total copolyamide, or the proportion of mixture (B) being 50–80 percent by weight, based on the total copolyamide, with the proviso that with a proportion of mixture (B) of up to 65 percent by weight, at most 70 mol.% of isophthalic acid, or of an amide-forming derivative thereof, in mixture (A) can be replaced by terephthalic acid or by an amide-forming derivative thereof, these weight percentages in the case of amide-forming derivatives of isophthalic acid or of terephthalic acid relating to identical functional groups.

2. A transparent copolyamide according to claim 1, which is obtained by reaction of a mixture (A) consisting of essentially stoichiometric amounts of a diamine of the formula I and isophthalic acid or terephthalic acid or a mixture of isophthalic acid and terephthalic acid, or amide-forming derivatives thereof, with a mixture (B) consisting of essentially stoichiometric amounts of a diamine of the formula II and terephthalic acid or an amide-forming derivative thereof, wherein R' and R" are each hydrogen, $R_1$ to $R_4$ independently of one another are hydrogen or methyl, $R_5$ is phenyl, straight-chain alkyl having 1–6 C atoms or —CH($R_{12}$)($R_{13}$), $R_6$ is hydrogen or methyl, $R_7$ and $R_{13}$ independently of one another are each alkyl having 1–6 C atoms, and $R_8$ and $R_{12}$ independently of one another are each alkyl having 1–4 C atoms, the proportion of mixture (B) being 50–75 percent by weight based on the total copolyamide, these weight percentages in the case of amide-forming derivatives of iso- or terephthalic acid relating to identical functional groups.

3. A transparent copolyamide according to claim 2, wherein R' and R" are each hydrogen, $R_1$ and $R_4$ are each methyl, $R_2$ and $R_3$ are each hydrogen, $R_6$ is hydrogen, $R_5$ is —CH($R_{12}$) ($R_{13}$), and $R_7$ and $R_{13}$ and $R_8$ and $R_{12}$ are each methyl, ethyl, n-propyl or n-butyl, and the proportion of mixture (B) is 50–70 percent by weight, based on the total copolyamide.

4. A transparent copolyamide according to claim 1, which is obtained by reaction of a mixture (A) consisting of essentially stoichiometric amounts of a diamine of the formula I and isophthalic acid or an amide-forming derivative thereof with a mixture (C) consisting of essentially stoichiometric amounts of a diamine of the formula III and terephthalic acid or an amide-forming derivative thereof, wherein R' and R" are each hydrogen, $R_1$ to $R_4$ independently of one another are each hydrogen or methyl, $R_9$ is cycloalkyl having 5–8 ring C atoms, and $R_{10}$ and $R_{11}$ are each methyl or together are alkylene having 4–7 C atoms, the proportion of mixture (C) being 65–75 percent by weight, based on the total copolyamide, these weight percentages in the case of amide-forming derivatives of iso- or terephthalic acid relating to identical functional groups.

5. A transparent copolyamide according to claim 4, wherein R' and R" are each hydrogen, $R_1$ and $R_4$ are each methyl, $R_2$ and $R_3$ are each hydrogen, $R_9$ is cyclopentyl, and $R_{10}$ and $R_{11}$ together are tetramethylene, or $R_9$ is cyclohexyl, and $R_{10}$ and $R_{11}$ together are pentamethylene, and the proportion of mixture (C) is 65–75 percent by weight, based on the total copolyamide.

6. A transparent copolyamide according to claim 1, which is obtained by reaction of a mixture (A) consisting of essentially stoichiometric amounts of a diamine of the formula Ia

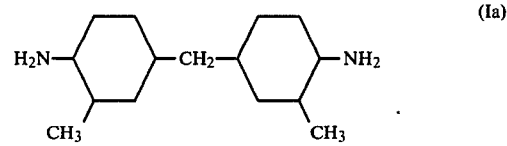

and isophthalic acid or terephthalic acid, or amide-forming derivatives thereof, or a mixture of isophthalic acid and terephthalic acid, or amide-forming derivatives thereof, in a molar ratio of isophthalic acid(derivative): terephthalic acid(derivative) of 5:5, with a mixture (B) consisting of essentially stoichiometric amounts of a diamine of the formula IIa

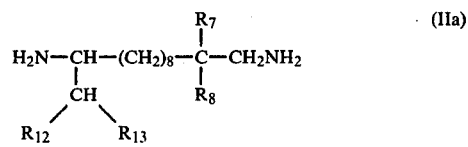

wherein $R_7$, $R_8$, $R_{12}$ and $R_{13}$ are each methyl or ethyl, and terephthalic acid or an amide-forming derivative thereof, the proportion of mixture (B) where $R_7$, $R_8$, $R_{12}$ and $R_{13}$ are each methyl being 60–75 percent by weight based on the total copolyamide, and where $R_7$, $R_8$, $R_{12}$ and $R_{13}$ are each ethyl being 50–65 percent by weight based on the total copolyamide, these weight percentages in the case of amide-forming derivatives of iso- or terephthalic acid relating to identical functional groups.

7. A transparent copolyamide as claimed in claim 1, which is obtained by reacting a mixture (A) of essentially stoichiometric amounts of 4,4'-diamino-3,3'-dimethyldicyclohexylmethane and isophthalic acid with a mixture (B) of essentially stoichiometric amounts of 1-isopropyl-10,10-dimethyl-1,11-diaminoundecane and terephthalic acid, said mixture (B) amounting to from 60 to 75 percent by weight, based on the total copolyamide.

8. A transparent copolyamide as claimed in claim 1, which is obtained by reacting a mixture (A) of essentially stoichiometric amounts of 4,4'-diamino-3,3'-dimethyldicyclohexylamine and isophthalic acid with a mixture (B) of essentially stoichiometric amounts of 1-(3-pentyl)-10,10-diethyl-1,11-diaminoundecane and terephthalic acid, said mixture (B) amounting to from 50 to 65 percent by weight based on the total copolyamide.

9. A transparent copolyamide as claimed in claim 1, which is obtained by reacting a mixture (A) of essentially stoichiometric amounts of 4,4'-diamino-3,3'-dimethyldicyclohexylamine and terephthalic acid with a mixture (B) of essentially stoichiometric amounts of 1-isopropyl-10,10-dimethyl-1,11-diaminoundecane and terephthalic acid, said mixture (B) amounting to from 65 to 75 percent by weight, based on the total copolyamide.

* * * * *